Dec. 23, 1952    D. D. MURPHY    2,622,447
RESILIENT SUPPORTING MEANS FOR CONVEYER BELTS
Filed May 20, 1949    3 Sheets-Sheet 1

Inventor:
Donald D. Murphy
by Louis A. Maxson.
Attorney.

Dec. 23, 1952 D. D. MURPHY 2,622,447
RESILIENT SUPPORTING MEANS FOR CONVEYER BELTS
Filed May 20, 1949 3 Sheets-Sheet 2

Inventor:
Donald D. Murphy
By Louis A. Maxson
Attorney.

Dec. 23, 1952 D. D. MURPHY 2,622,447
RESILIENT SUPPORTING MEANS FOR CONVEYER BELTS
Filed May 20, 1949 3 Sheets-Sheet 3

Inventor:
Donald D. Murphy.
by
Louis A. Watson.
Attorney.

Patented Dec. 23, 1952

2,622,447

UNITED STATES PATENT OFFICE 2,622,447

RESILIENT SUPPORTING MEANS FOR CONVEYER BELTS

Donald D. Murphy, New Philadelphia, Ohio, assignor to Joy Manufacturing Company, Pittsburgh, Pa., a corporation of Pennsylvania Application May 20, 1949, Serial No. 94,272

9 Claims. (Cl. 74—230.7)

1

This invention relates to improvements in belt conveyors, and particularly to improvements in idlers or guide rollers for the same.

In the use of endless belts for conveying material, it is customary to employ idlers or guide rollers for supporting the active and inactive runs of the belt. These idlers ordinarily are so designed as to guide the return run of the belt in a transversely flat condition and to guide the active or material-conveying run of the belt in such a manner as to trough the same to the necessary degree. In both cases, in conventional constructions, the idlers afford substantially continuous linear contact for supporting the belt, in both runs thereof, throughout its full width.

It is customary to deposite the material to be transported by conveyor belts on the belt at one or more loading points, and frequently the feed to the belt is by gravity; and to properly sustain the belt at the point or points where loading takes place the idlers may be placed more closely together. The belt, if supported by non-yielding metallic idlers, is then subjected to rather severe treatment, the blows struck it by the material falling upon it having to be absorbed within the material of the belt, which is backed up by unyielding material. If the material being conveyed possesses sharp points or corners, cutting of the belt will result; and in any event the belt will undergo severe punishment in the event that the falling material includes lumps of substantial size and mass. To overcome some of the disadvantages, and avoid some of the injurious effects mentioned, belt conveyor idler or guide rollers of various forms and made of yielding material have been employed; and it is a primary object of my invention to provide an improved belt idler or guide roller of a construction having improved guide roller elements, and having such elements assembled and supported in an improved manner. A further object of the invention is to provide an improved guide roller element of improved construction and adapted for assemblage on a supporting shaft with other like elements in an improved manner. Other objects and advantages of the invention will appear from the following portions of the specification and from the appended claims.

In the accompanying drawings, in which one illustrative embodiment of the invention in its various aspects is shown for purposes of illustration—

Fig. 1 is a plan view, with parts broken away, showing a portion of a belt conveyor of the

2 troughed active run type, in which the active run is supported by idlers of the character which embody the present invention.

Figure 4:
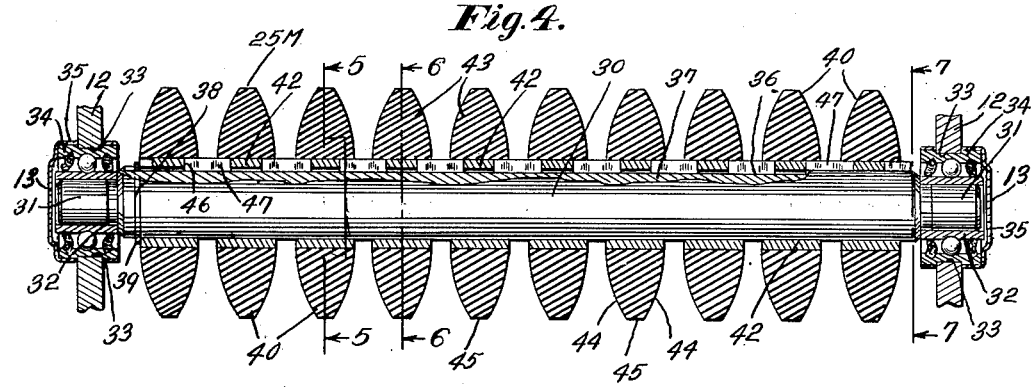
Fig. 4 is a further enlarged longitudinal sectional view through a complete idler unit, the mounting for the shaft of the unit being broken away.
Figure 5:
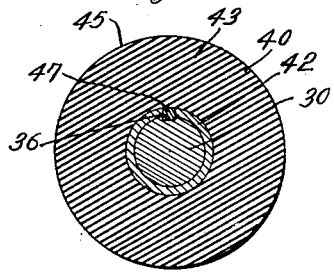
Figure 6:
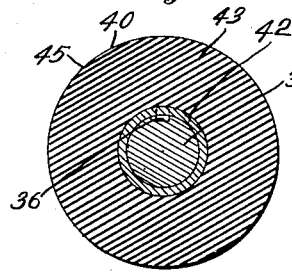

Figs. 5 and 6 are vertical transverse sections through belt idler roller elements and through the supporting shaft therefor, these figures being taken, respectively, on the planes of the section lines 5—5 and 6—6 of Fig. 4.

Figure 7:
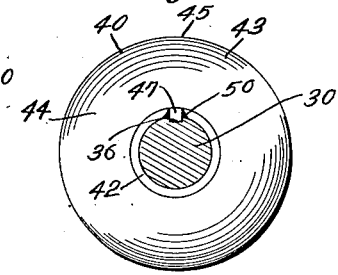

Fig. 7 is a vertical sectional view on the plane of the line 7—7 of Fig. 4, showing the supporting shaft in section and the end belt idler element in side elevation.

Figure 8:
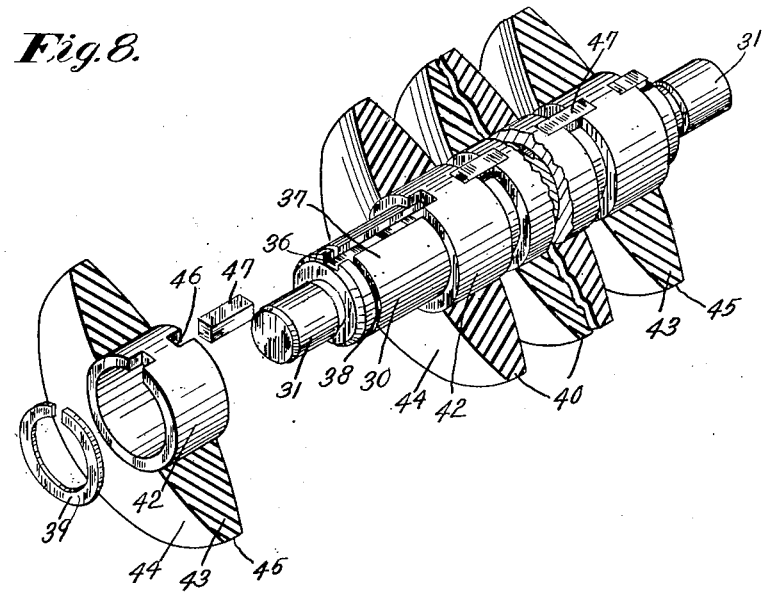

Fig. 8 is a somewhat exploded perspective view, with a portion omitted for compactness of disclosure, of the elements of a belt idler unit with some portions partially disassembled and with the supporting shaft shown in such a position that the manner of assembly may be readily seen.

Figure 1:
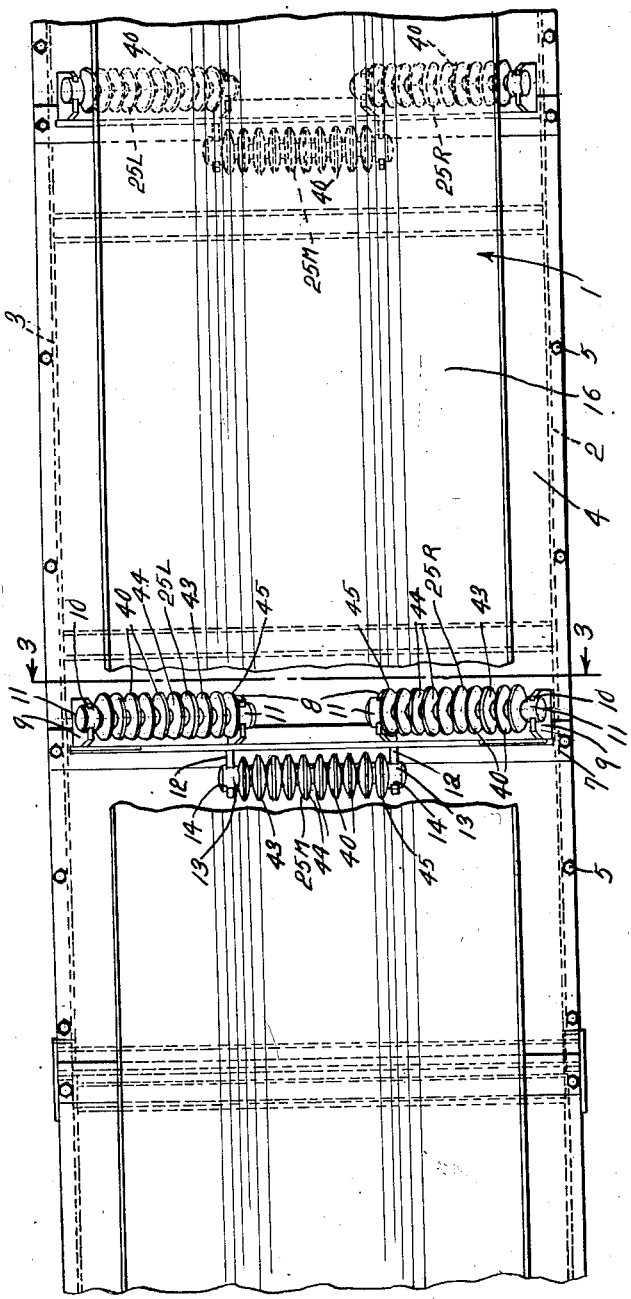
Figure 2:
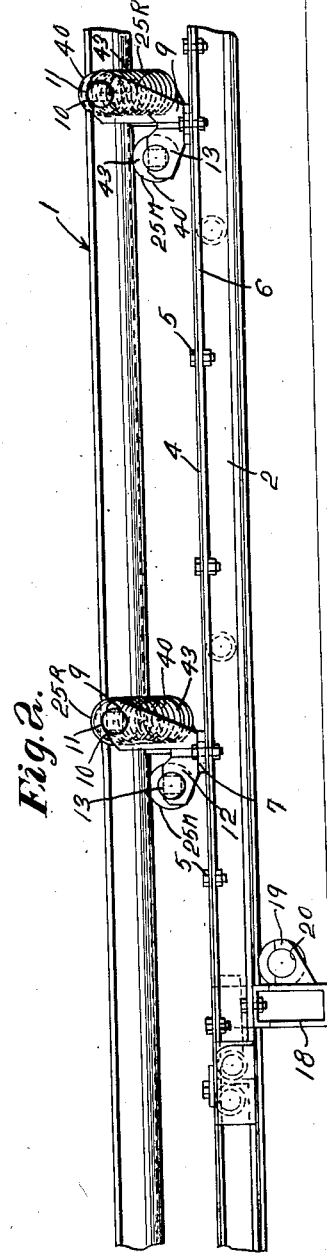
Fig. 2 is a side elevational view of the conveyor of Fig. 1.
Figure 3:
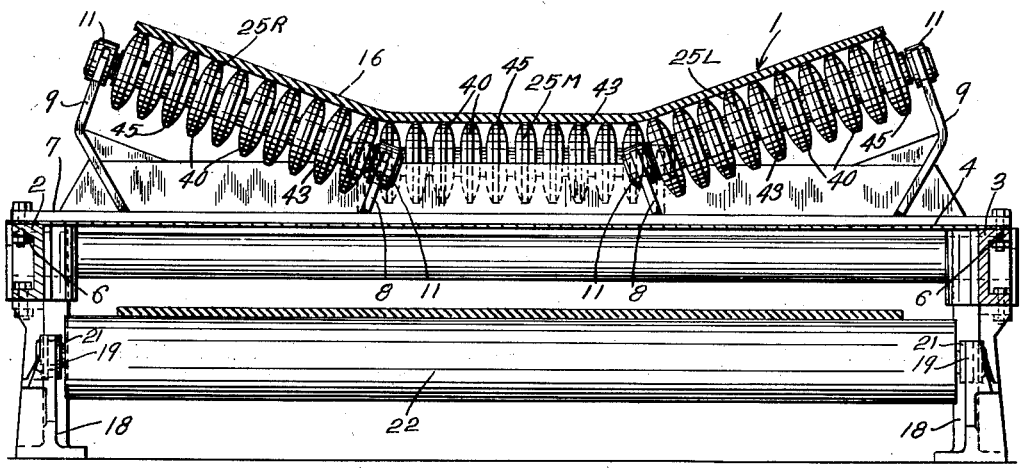
Fig. 3 is a transverse vertical sectional view on an enlarged scale, the section being taken on the plane of the section line 3—3 of Fig. 1.

Referring first to Figs. 1 and 2, it will be observed that the belt conveyor, generally designated 1, includes side rail or frame elements 2 and 3, herein shown as channel elements supported with the bottoms of the channels in vertical planes. Between the side frames there extend plate sections 4 of appropriate thickness, these being bolted, as at 5, to the upper flanges 6 of the channel elements. Bolted to the tops of the plates 4 are belt idler roller fork assemblies 7, these including, at either side of the center line of the conveyor, obliquely upwardly extending plate portions 8 and 9 slotted, as at 10, to receive anti-friction bearings 11, the plate portions 9 being located near the outer edges or sides of the conveyor structure, and the plate portions 8 fairly near the center but spaced apart a substantial distance; and other spaced arm or plate portions 12 also form a central part of the fork assemblies 7 and are adapted to support anti-friction bearings 13 within slots 14 corresponding to the slots 10 previously mentioned. It will be noted that the central points in the slots 10 formed on the arms 8 and 9 lie in a common vertical transverse plane, while the central points in the slots or recesses 14 in the arms 12 lie in a spaced parallel vertical plane, and the three sets of forks are adapted to provide supports for three belt idler roller units on each fork assembly 7, there being two inclined units and one horizontal unit so disposed as to provide the desired troughing of a belt 16. The side elements 2 are supported by upright mine floor engaging supports 18. Each carries a laterally projecting bracket 19 providing a recess 20 for receiving the bearing elements 21, which journal a cylindrical (as illustrated) belt idler roller 22 of greater length than the width of the belt 16. As to the rollers 22 nothing more needs to be said except that they may be replaced by built-up roller units of the general character and construction of those which are associated with the active run of the belt, there being no occasion for troughing the return run, however. The axes of all the belt roller idler units which might be incorporated in each such replacement structure would lie in a common straight line.

In the illustrative embodiment of the invention shown, the improved belt guiding roller units supported by the three pairs of forks are essentially the same, and these are designated for ease of reference as 25M, 25L and 25R, 25M being the central horizontal unit, 25L being the unit at the left hand side of the conveyor looking along the latter towards the right in Fig. 1, and 25R being the unit at the right hand side of the conveyor looking towards the right in Fig. 1. Each of the units 25M, 25L and 25R includes a shaft 30. Reference may now for convenience be made to Fig. 4, which illustrates the unit 25M. Each shaft 30 is provided with reduced end portions 31 for reception within the inner race 32 of the antifriction bearings 11 or 13, as the case may be (13, in Fig. 4), which anti-friction bearings are, as above noted, suitably supported in seats formed within the fork portions previously mentioned. It may be mentioned that these fork portions have parallel side walls 33, 33 and that the outer bearing race 34 and the bearing shield element 35 are suitably cut away to permit the snug fitting of the antifriction bearings between the surfaces 33 and their firm mounting in the respective fork elements which they engage. The shafts 30 are each provided with a keyway 36 extending throughout at least the major portion of the main body 37—the portion between the reduced ends 31—of the shaft 30. The shaft portion 37 is provided with an annular groove 38 adjacent one end thereof to receive a suitable snap ring 39. The shaft is adapted to receive a plurality of resilient roller elements, or impact idler rollers, 40. Each of these is in the general form of an oblate spheroid having a central cylindrical opening therethrough at its center. Each of these rollers includes a central sleeve portion or element 42. This element 42 is desirably metallic, so that the bonding of rubber or a rubber substitute to it may be readily possible. To this cylindrical sleeve or annulus there is suitably bonded a rubber or rubber-substitute annulus 43 whose side surfaces 44 converge toward the outer periphery of these elements, which elements are bounded by a generally cylindrical, narrow surface 45 which is adapted to provide a relatively narrow contact surface with the lower surface of the belt 16. The sleeves or annuli 42 each have their opposite ends in parallel planes, and they each have relatively shallow notches or recesses 46 in their opposite edges, these recesses or notches being of substantially the same width as the keyway 36 and being shrouded by the material of the annulus 43 and providing abutment surfaces engageable by key elements to prevent turning of the sleeves on the shaft 30. The notches or recesses 46 are adapted to receive short key elements 47, and the length of such key elements is so selected that when they are disposed in the keyway 36 with their ends received in the adjacent notches 46 of a pair of resilient roller elements 40 and with the inner ends of the notches or recesses contacting the end surfaces of the key, there will be provided the desired spacing, longitudinally of the shaft 30, of the peripheral surfaces 45 upon adjacent rollers.

In assembling a complete roller unit a snap ring 39 is seated in the groove 38. A roller element 40 is then slid onto the shaft 30 from the opposite end of the latter until its central metallic sleeve or annulus 42 contacts the snap ring 39. It is optional whether a short section of key stock be received between the snap ring and the bottom of the adjacent recess 46, with its inner edge received in the keyway 36. Another key 47 will then be placed in the keyway and slid to bring its end nearer the split ring 39 into the recess or notch 36 at the side of the first roller element 40 away from the split ring 39. A second roller will then be slid onto the shaft and moved as far towards the split ring 39 as will be permitted by the depth of its notch 46 which is slid over the end of the key 47 which was just placed in the keyway. Additional keys and roller elements will be added as required by the length of the shaft 30, until the opposite end of the enlarged portion 37 of the shaft is reached, where a final key element 47 will be slipped into the keyway and into the adjacent notch 46 of the last added roller element 40. After the parts are snugly compacted longitudinally of the shaft, the last key element will be welded in place, as at 50. Thereafter, if occasion arises for removing the roller elements from the shaft, as may occur after prolonged wear, the snap ring 39 will be removed from its groove 38 and slid off of the end of the shaft 30, which will of course have been removed from its mounting before disassembly is started. After the snap ring has been removed from the shaft, the roller elements 40 and the key portions 47 can be quickly removed from the shaft, the roller elements being taken off, as will be noted, from the end of the shaft opposite that over which they were passed in assembling them originally on the shaft.

When a roller unit is completely assembled its antifriction bearings may be slipped onto its reduced ends 31 and the complete unit then is mounted in the brackets or forks previously mentioned.

The central yielding belt idler unit 25M and the adjacent side units 25L and 25R will provide a resilient support for the belt which passes over them, their peripheral surfaces will be deformed under the loading of the belt in a manner to protect the latter from excessively rapid wear and from damage as heavy lumps or lumps with sharp corners are dropped upon it. Thanks to the construction above described, the spacing of the roller elements can be adapted to different conditions simply by changing the length of the intermediate keys 47. The keys will be prevented from escaping and being lost, by reason of the fact that overlying or surrounding portions of the resilient material engages the outer surface of each key. The presence of the resilient body material of the roller elements makes it possible simply to slot through the ends of the sleeves 42 instead of having to form recesses in these which would have an outer metallic circumferential wall as well as

What I claim is:

1. In a belt conveyor idler, a roll comprising a shaft having a groove along the periphery thereof, a stop adjacent one end of said groove, a plurality of resilient idlers each consisting of a resilient body having a central sleeve fitting said shaft and establishing a coaxial relation between said body and shaft, a plurality of keys received in said groove and held therein by said idlers and having connections with said sleeves for holding said idlers against rotation relative to said shaft and spacing them along the shaft, and means adjacent the other end of said groove for holding said idlers and said keys against escape.

2. In a belt conveyor idler, a roll comprising a shaft having a groove along the periphery thereof, a circumferential groove adjacent one end of said first mentioned groove, a stop snap ring in said circumferential groove, a plurality of resilient idlers each consisting of a resilient body having a central sleeve fitting said shaft and establishing a coaxial relation between said body and shaft, a plurality of keys received in said groove and held therein by said idlers and having connections with said sleeves for holding said idlers against rotation relative to said shaft and spacing them along the shaft, and means including a key portion welded to said shaft adjacent the other end of said groove for holding said idlers and said keys against escape.

3. In a belt conveyor idler, a roll comprising a shaft having a groove along the periphery thereof, a stop adjacent one end of said groove, a plurality of resilient idlers each consisting of a resilient body having an end-notched central sleeve fitting said shaft, a plurality of keys received in said groove and in the end notches in said sleeves for holding said idlers against rotation relative to said shaft and spacing them along the shaft, and means adjacent the other end of said groove for holding said idlers and said keys against escape.

4. In a belt conveyor idler, a roll comprising a shaft having a groove along the periphery thereof, a circumferential groove adjacent one end of said first mentioned groove, a stop snap ring in said circumferential groove, a plurality of resilient idlers each consisting of a resilient body having an end-notched central sleeve fitting said shaft, a plurality of keys received in said groove and in the end notches in said sleeves for holding said idlers against rotation relative to said shaft and spacing them along the shaft, and means including a key portion welded to said shaft adjacent the other end of said groove for holding said idlers and said keys against escape.

5. In a belt conveyor idler, a roll comprising a shaft having a groove along the periphery thereof, a stop adjacent one end of said groove, a plurality of resilient idlers each consisting of a resilient body having a central sleeve fitting said shaft, said body outwardly of said sleeve conforming in shape with an oblate spheroid and said sleeve having end notches shrouded peripherally by the material of said body, a plurality of keys received in said groove and with their ends received in notches in adjacent idlers for holding said idlers against rotation relative to said shaft and spacing them along the shaft, and means adjacent the other end of said groove for holding said idlers and said keys against escape.

6. In a belt conveyor idler, a roll comprising a shaft having a groove along the periphery thereof, a circumferential groove adjacent one end of said first mentioned groove, a stop snap ring in said circumferential groove, a plurality of resilient idlers each consisting of a resilient body having a central sleeve fitting said shaft, said body outwardly of said sleeve conforming in shape with an oblate spheroid and said sleeve having end notches shrouded peripherally by the material of said body, a plurality of keys received in said groove and with their ends received in notches in adjacent idlers for holding said idlers against rotation relative to said shaft and spacing them along the shaft, and means including a key portion welded to said shaft adjacent the other end of said groove for holding said idlers and said keys against escape.

7. A resilient impact idler including a resilient body in the form of an oblate spheroid having an axial cylindrical core removed and a metallic sleeve surrounded by said body and having said body bonded to it, said sleeve having a bore to fit a supporting shaft and further having at least one of its opposite ends notched to provide longitudinally extending abutment surfaces shorter than its length for holding it against turning relative to a supporting shaft and to locate it in one longitudinal direction relative to said shaft.

8. A resilient impact idler including a resilient body in the form of an oblate spheroid having an axial cylindrical core removed and a metallic sleeve surrounded by said body and having said body bonded to it, said sleeve having at least one key-receiving notch opening through an end thereof and through the outer periphery thereof and said body shrouding the radially outward side of the notch and providing an outer wall for the latter.

9. A resilient impact idler including a resilient body in the form of an oblate spheroid having an axial cylindrical core removed and a metallic sleeve of a length equal to the thickness of said body and having alined key-receiving notches formed in and opening through its opposite ends and its outer periphery, said sleeve surrounded by said body and having said body bonded to it and said notches being closed at their radially outer sides by said resilient body.

DONALD D. MURPHY.

REFERENCES CITED

The following references are of record in the file of this patent:

UNITED STATES PATENTS

| Number | Name | Date |
|---|---|---|
| 278,666 | Mansfield | May 29, 1883 |
| 2,271,166 | Weiss | Jan. 27, 1942 |
| 2,353,510 | Searles et al. | July 11, 1944 |
| 2,484,752 | Searles | Oct. 11, 1949 |

FOREIGN PATENTS

| Number | Country | Date |
|---|---|---|
| 820,609 | France | Aug. 2, 1937 |